W. GOLDIE.

Shingle Cutting Machine.

No. 9,251. Reissued June 15, 1880.

Attest:

A. Barthel

Charles J. Hund

Inventor:

Wm. Goldie

By Atty

Thos. S. Sprague

F. PETERS, PHOTO-LITHOGRAPHER, WASHINGTON, D. C.

UNITED STATES PATENT OFFICE.

WILLIAM GOLDIE, OF FENTON, MICHIGAN.

SHINGLE-CUTTING MACHINE.

SPECIFICATION forming part of Reissued Letters Patent No. 9,251, dated June 15, 1880.

Original No. 209,472, dated October 29, 1878. Application for reissue filed November 8, 1879.

*To all whom it may concern:*

Be it known that I, WILLIAM GOLDIE, of Fenton, in the county of Genesee and State of Michigan, have invented an Improvement in Shingle-Cutting Machines, of which the following is a specification.

The nature of my invention relates to certain new and useful improvements in the construction and operation of that class of cutting-machines employed in cutting shingles, the term "cutting" being used in contradistinction to the term "sawing;" and the invention consists in providing the machine with a knife for beveling off the thick ends of the shingles, and, further, in the combination and arrangement of the parts for holding the block and cutting the shingles therefrom, all as fully hereinafter explained.

Figure 1:
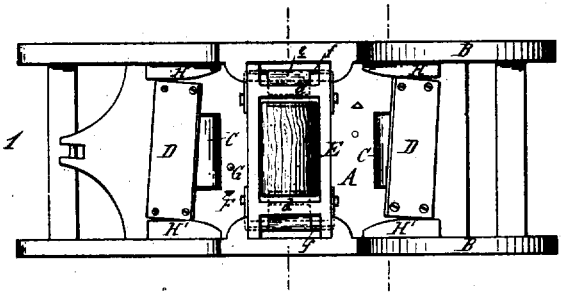
Figure 2:
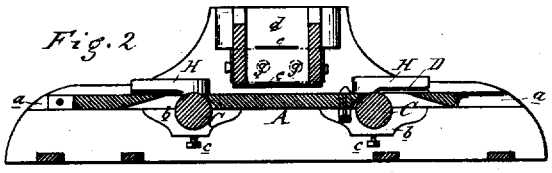
Figure 3:
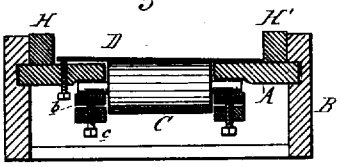
Figure 4:
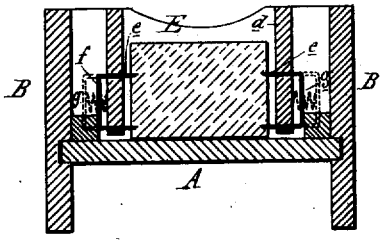
Figure 5:
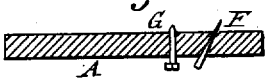

In the accompanying drawings, which form a part of this specification, Figure 1 is a top plan of my improved machine. Fig. 2 is a central longitudinal section of the same; Fig. 3, a cross-section on the line 3 3; Fig. 4, a cross-section on the line 4 4; and Fig. 5, a cross-section through a portion of the bed, showing the marking-spur and beveling-knife.

Like letters denote corresponding parts.

A represents the bed of the machine, adapted to receive a reciprocating motion in grooves *a* in the cheeks B of the device. Suitably journaled in bearings *b* below the bed, and capable of vertical adjustment by means of the set-screws *c*, are two rollers or drums, C, one being placed near each end of the bed, as shown in Figs. 1 and 2, and so arranged that their upper peripheries will be presented through corresponding openings in the bed, and upon the same plane, or slightly above, with the top of the bed. Secured transversely and diagonally are the cutters or knives D, one end of each being raised above the plane of the bed, in order to give the proper bevel to the shingle.

The center of the compression-roller is placed just in advance of the cutting-edge of the knife, thereby preventing the checking of the timber as it is being cut.

E is a frame, box, or well, open at top and bottom, and secured between the sides or cheeks B at a sufficient distance above the bed, and about midway between the two ends of the machine, to allow the knives to pass under it. This box is provided with two vertical partitions, *d*, which are perforated, as shown in Fig. 4, to allow the sheet-studs *e* to pass through. These studs are connected to a plate, *f*, between which and the partition is interposed the spring *g*.

A cutter, F, is secured in the bed of the machine, and a spur, G, is also secured in the same manner. To the bed, at each end and in close proximity to the cutters D, are secured the curved or wedge-shaped blocks H H′, which clamp the spurs *e* to the block, and thus the said blocks H and spurs *e* constitute a clamping device.

In practice the bolt from which it is designed to cut the shingles is placed in the box E. The first movement of the bed to the right or left brings the cutter F in contact with the corresponding lower corner of the bolt, and chamfers it off, while the spur G will mark a line to show how much of the shingle being made should be laid to the weather. In the further progress of the bed the blocks H H′ come in contact with plates *f*, and force the sheet-studs *e* into the bolt, holding it firmly between the studs, and the drum C under the knife D, which drum acts as a compression device, compressing the block just at the point of the cut, thus preventing the formation of "shakes" when the shingle is cut by the knife, which occurs where the roller is located so as to simply press the block in advance of the knife. When the bed has completed its movement the blocks H H′ will recede from their contact with the plates *f* with the return movement of the bed, and the springs *g* will withdraw the studs and allow the bolt to drop onto the bed, when the continued motion on the return of the bed will bring the knives, cutters, and spurs upon the opposite end of the bed into action, the blocks on that end forcing inwardly with the sheet-studs *e*, so that at each reciprocating motion of the bed two complete shingles are made with their butts chamfered or beveled, to allow a gentle flow of the water off them, and marked to show as much as should be exposed to the weather.

It will be observed that by the location of the marking-spurs in the bed the block is marked before the shingle is cut, and thus the first shingle cut off is marked, which is not the case where the marker is set in the body of the knife. It also prevents the necessity of boring holes in the knife for the reception of the marker, which holes necessitate the employment of a new knife or the grinding away of a large portion thereof when the knife has become worn to the depth of the holes.

It will also be observed that the cutters F, for clamping the ends of shingles, are arranged diagonally with respect to each other on opposite ends of the bed, which arrangement allows of the block being cut at opposite corners at different times in the motion of the bed, thus to some extent equalizing the power required to drive the machine.

What I claim as my invention is—

1. In a shingle-cutting machine, the combination of an intermittent clamping device, bed A, two cutters or knives, and the pressure bars or rollers, set in the frame at an angle to the knives, the relative angles of the knives or rollers alternating to compress each shingle equally, substantially as described.

2. In a shingle-cutting machine, the combination, with the reciprocating bed A, of the box E, supported centrally over such bed, the spring-plate *f*, carrying studs *e*, at the sides of the box, and the wedge-blocks H H′ on each end of the reciprocating bed, substantially as set forth.

3. In a shingle-cutting machine, the combination of the reciprocating bed A, having inclined cutting-knife D, roller C, and wedge-blocks H H′ at each end, with the box E, mounted centrally over such bed and provided with spring-plates *f* and studs *e*, substantially as shown and described.

4. In a shingle-cutting machine, in combination with two cutters or knives, the pressure bars or rollers *c*, set in the frame at an angle to the knives, the relative angles of the knives and rollers alternating to compress each shingle equally, substantially as described.

WM. GOLDIE.

Witnesses:
H. S. SPRAGUE,
CHAS. J. HUNT.